United States Patent
Lim et al.

(10) Patent No.: US 7,177,097 B2
(45) Date of Patent: Feb. 13, 2007

(54) SYSTEM AND METHOD FOR EXTENDING VIEWING ANGLE OF LIGHT EMITTED FROM LIGHT PIPE

(75) Inventors: Hui-Leng Lim, Newark, CA (US); Igor Vinogradov, Bay Shore, NY (US); Patrick Wallace, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/039,436

(22) Filed: Jan. 20, 2005

(65) Prior Publication Data

US 2006/0158746 A1 Jul. 20, 2006

(51) Int. Cl.
*G02B 13/18* (2006.01)
*G02B 3/02* (2006.01)
*F21V 9/00* (2006.01)

(52) U.S. Cl. ...................... 359/709; 362/511
(58) Field of Classification Search ........ 359/707–709, 359/738; 362/551, 582, 511
See application file for complete search history.

(56) References Cited

U.S. PATENT DOCUMENTS

| | | | | |
|---|---|---|---|---|
| 3,439,157 A | * | 4/1969 | Myles | 362/551 |
| 4,750,797 A | * | 6/1988 | Mori | 362/551 |
| 4,826,273 A | * | 5/1989 | Tinder et al. | 362/551 |
| 5,897,201 A | * | 4/1999 | Simon | 362/551 |
| 6,586,756 B1 | * | 7/2003 | Kopperl et al. | 250/493.1 |

* cited by examiner

*Primary Examiner*—Alicia M Harrington
(74) *Attorney, Agent, or Firm*—Fay Kaplun & Marcin, LLP

(57) ABSTRACT

Described is a light pipe having a first end receiving light beams from a light source, a light pipe body through which the light beams travel and a second end including a dispersion structure with a light emitting surface, the dispersion structure being a substantially conical shaped depression in the second end, the light beams being emitted from the light emitting surface of the dispersion structure at a plurality of angles.

15 Claims, 4 Drawing Sheets

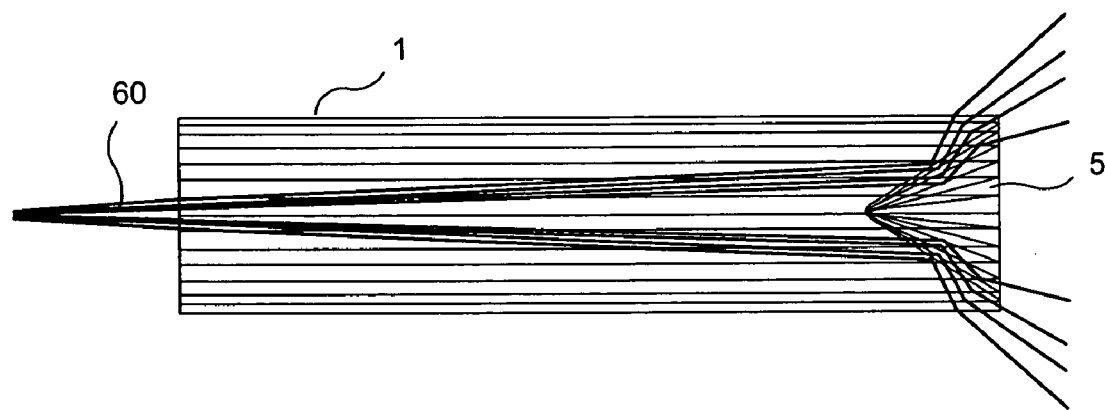
F I G. 6
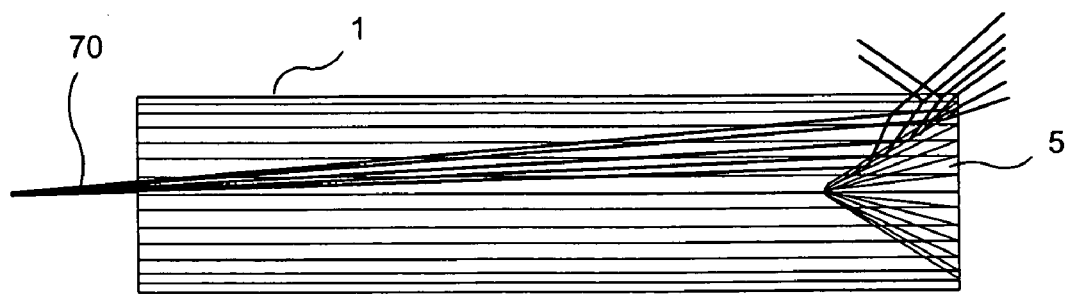
F I G. 7

SYSTEM AND METHOD FOR EXTENDING VIEWING ANGLE OF LIGHT EMITTED FROM LIGHT PIPE

BACKGROUND

Light-pipes (e.g., fiber optic cable) are used when light needs to be brought from a source to another location where it can be seen or used. In cases where the function of the light emitted is to provide some form of visual indication to the user, most light-pipe designs do not provide adequate dispersion of light to allow the user to see the light in wider angles than looking directly at the source. This is especially true when these light indicators are used on mounted devices such as networking equipment where the light needs to be observed from some distance at all angles. There have been some designs which create a better light dispersion by covering the emitting surface with a thin opaque scattering layer. However, these designs create a dimming effect which is undesirable. A manner of dispersing the light without sacrificing the light intensity is desired.

SUMMARY OF THE INVENTION

A light pipe having a first end receiving light beams from a light source, a light pipe body through which the light beams travel and a second end including a dispersion structure with a light emitting surface, the dispersion structure being a substantially conical shaped depression in the second end, the light beams being emitted from the light emitting surface of the dispersion structure at a plurality of angles.

In addition, a method for dispersing light beams over a range of angles by receiving light beams into a body of a light pipe, transmitting the light beams through the body of the light pipe to a dispersion structure of the light pipe, the dispersion structure being a substantially conical shaped depression in a light emitting end of the light pipe and emitting a first portion of the light beams from the dispersion structure, wherein the first portion of light beams are emitted upon first contact with an emission surface of the dispersion structure, the first portion of light beams being refracted when emitted.

Furthermore, a system including a light source producing light beams and a light pipe including a dispersion structure with a light emitting surface, the dispersion structure being a substantially conical shaped depression in the second end, the light beams being emitted from the light emitting surface of the dispersion structure at a plurality of angles.

BRIEF DESCRIPTION OF THE DRAWINGS

FIG. 6 shows a first example of a bundle of light beams traveling through a light pipe having a conical depression dispersion structure according to the present invention.

FIG. 7 shows a second example of a bundle of light beams traveling through a light pipe having a conical depression dispersion structure according to the present invention.

DETAILED DESCRIPTION

Figure 1:
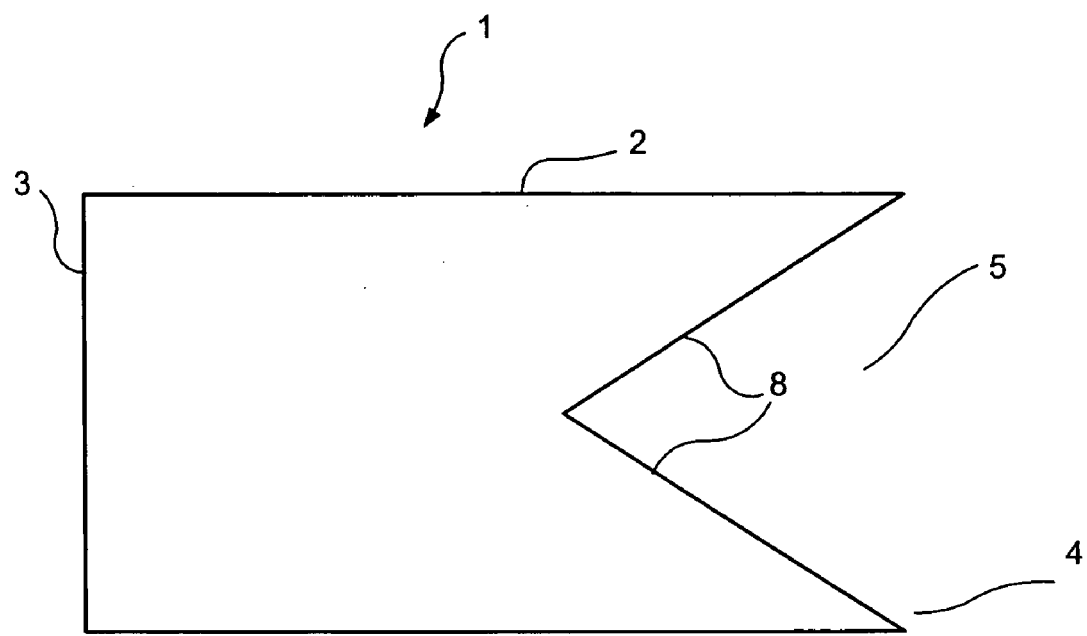
FIG. 1 illustrates an exemplary embodiment of a light pipe having an exemplary dispersion structure at a light-emitting end according to the present invention.

The exemplary embodiment of the present invention describes dispersion structures which may be added to the light-emitting surface of a light pipe to increase the light dispersion of the light pipe. FIG. 1 illustrates an exemplary light pipe 1 having the exemplary dispersion structure 5 on the light-emitting end 4 of the light pipe. In this example, the light pipe 1 has a substantially cylindrical body 2 having a substantially circular cross-section. The light pipe 1 may be made of any of the generally known material used in constructing light pipes, the most common being material such as glass or plastic (e.g., polycarbonate, acrylic, etc.). The light pipe 1 has a first light receiving end 3 which receives light from a light source (not shown). Those of skill in the art will understand that the light source is generally a separate device which generates the light to be carried through the light pipe 1, but it may be included as a portion of the light pipe 1.

At a second light-emitting end 4 of the light pipe 1, a light-emitting surface 8 is provided. In a standard light pipe, the light-emitting surface is a flat end of the light pipe, i.e., a flat circular cross-section of the light pipe. However, in this exemplary embodiment of the present invention, the light-emitting surface 8 is formed by the dispersion structure 5. The light travels through the light pipe 1 and is dispersed to users by the light-emitting surface 8. The dispersion structure 5 provides for a larger field of view for the light than if the light-emitting surface 8 were flat. In addition, the dispersion structure 5 does not significantly reduce the intensity of the light traveling through the light pipe 1.

Figure 2:
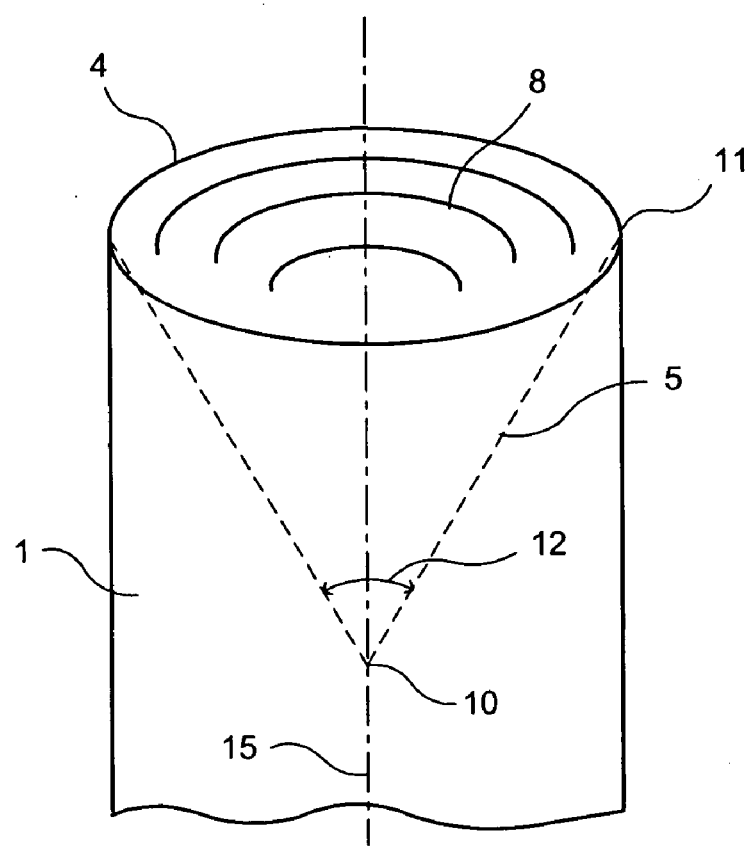
FIG. 2 shows a second view of the exemplary light pipe having the exemplary dispersion structure according to the present invention.

The dispersion structure 5 is a conical shaped depression formed at the light-emitting end 4 of the light pipe. FIG. 2 shows a second view of the exemplary light pipe 1 having the exemplary dispersion structure 5. As shown in FIG. 2, the dispersion structure 5 is a conical depression in the light-emitting end of the light pipe 1. The dispersion structure 5 has a generally conical shape having an apex 10 and a base 11. The dispersion structure 5 has a generally circular cross-section. The cross-sectional radius of the dispersion structure increases from the apex 10 to the base 11 at the light-emitting end 4. The entire inside surface of the depression forms the light-emitting surface 8.

The angle 12 of the dispersion structure 5 is approximately 74 degrees. Testing has shown that the light dispersion of a dispersion structure 5 having an angle of approximately 74 degrees provides a substantial increase in the viewing angle dispersion. This increase will be described in greater detail below. However, those of skill in the art will understand that conical depression dispersion structures having other angles may be used to accomplish specific dispersion increases. The dispersion structure 5 depression may be created in the light pipe 1 using any of the manufacturing techniques known for the particular material used to manufacture the light pipe 1.

In addition, FIG. 2 shows that the radius of the dispersion structure 5 at the light-emitting end 4 is equal to the radius of the light pipe 1 at the light-emitting end. While this is an ideal situation, the manufacturing and tooling tolerances for creating the light pipe 1 with the dispersion structure 5 may not allow for these radii to be equal. The described radii should be kept as near to equal as possible.

The dispersion structure 5 is shown as substantially rotationally symmetrical about its vertical centerline. Thus, in FIG. 2, the dispersion structure 5 is rotationally symmetrical about the vertical centerline 15 which runs through the apex 10. Those of skill in the art will understand that the dispersion structure 5 is not required to be rotationally symmetrical, i.e., the depression may not be a perfect conical shape. For example, there may be off-center conical depressions which focus the light beams in a pre-determined direction for a specific application.

Figure 3:
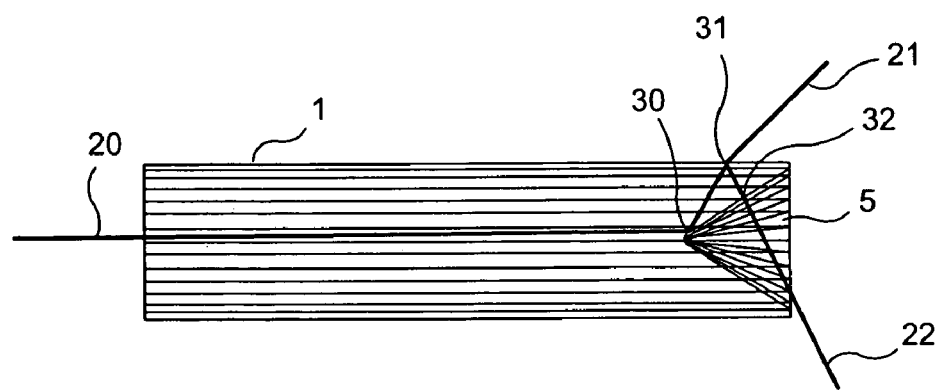
FIG. 3 shows a first example of a light beam traveling through a light pipe having a conical depression dispersion structure according to the present invention.

FIG. 3 is a second cross-sectional view of a dispersion structure 5 which is a conical depression in the light pipe 1. FIG. 3 also shows a single light beam 20 generated by a light source (not shown) which travels through the light pipe 1 to be dispersed by the dispersion structure 5. In this example, the light pipe 1 is made of a common material such as glass or plastic (e.g., polycarbonate, acrylic, etc.), while the light is to be dispersed into air. For the purposes of molding the light pipe 1, it may be advantageous for the light pipe 1 to be made of a single material which has a refractive index greater than that of the medium into which the light is to be emitted.

Those of skill in the art will understand that it may also be possible for the light pipe 1 body and the light-emitting surface 8 to be made of different materials and for the dispersion to be into a material other than air. In general, the refraction index of the material will be less in the direction of the travel of the light beams 20–22. Thus, the refraction index of air is less than the refraction index of the material of the light emitting surface 8.

The following description for FIG. 3 and the subsequent figures will describe the travel of light beams (e.g., light beam 20) through the light pipe 1. It should be noted that the light beams are not drawn to accurately illustrate the angles of reflection and refraction, but are only shown to generally illustrate the principal that the exemplary dispersion structure provides an improved dispersion characteristics over the prior art. The light beams are only shown to illustrate the general direction of travel of the light beams through the light pipe 1.

The light beam 20 is traveling through the light pipe 1 in a direction that is 1 degree off center from the longitudinal axis that runs through the apex of the dispersion structure 5. The light beam 20 hits the material-air boundary formed by the dispersion structure 5 at point 30 and is reflected towards the side of the light pipe 1 where the light beam 20 again hits the material air boundary formed by the side of the light pipe 1 at point 31. The light beam 20 hits the material-air boundary at point 31 and is refracted (bent) from its path of travel creating light beam 21 which continues to travel through the air. However, a portion of the light beam 20 is also reflected back into the light pipe 1 at point 31 and now is referred to as light beam 22. The light beam 22 travels through the light pipe until it hits the material-air boundary formed by the dispersion structure 5 at the point 32. The light beam 22 is refracted into the air at this point and then continues to travel through the air as illustrated in FIG. 3.

The refraction of the light beams is based on the principal that when light is incident upon a medium having a lesser index of refraction, the light beam is bent away from the normal so the exit angle is greater than the incident angle. This is governed by Snell's Law which can be expressed by the formula:

$$n_i * \sin \theta_i = n_r \sin \theta_r,$$

where, $n_i$=the refraction index of the material having the larger refraction index, $\theta_i$=the incident angle, $n_r$=the refraction index of the material having the smaller refraction index, and $\theta_r$=the exit angle.

Thus, in the case of a light beam which is normal to the light-emitting surface of the dispersion structure 5, the incident angle is zero (0), meaning that the exit angle is zero (0), i.e., there is no refraction or bending of the light beam.

However, as shown in FIG. 3, the light is not always refracted out of the light pipe 1, but rather is reflected back into the light pipe 1. This is referred to as a total internal reflection. As described above, the light beam will behave according to the formula for refraction described above when traveling from a material having a higher refractive index to a material having a lower refractive index. According to the formula, the exit angle $\theta_r$ will approach 90° as the incident angle $\theta_i$ increases. However, at some critical angle $\theta_c$ of the incident angle, and for all angles greater than $\theta_c$, there will be total internal reflection, i.e., the light beam will be reflected back into the light pipe 1 rather than being dispersed into the air. The critical angle $\theta_c$ may be determined using Snell's Law (described above), setting the refraction angle(exit angle) to 90° and solving for the incident angle $\theta_i$.

Those of skill in the art will understand that when a light beam is refracted/reflected, a certain amount of the light energy of the light beam will experience the opposite effect, e.g., when a light beam is refracted into the air, a certain portion will also be reflected back into the light pipe 1. In some instances, this opposite effect is negligible and results in the small losses of light energy which are generally experienced by light pipes. However, in other instances this opposite effect may result in two usable light beams as is shown by the splitting of light beam 20 into light beams 21 and 22 in FIG. 3.

Figure 4:
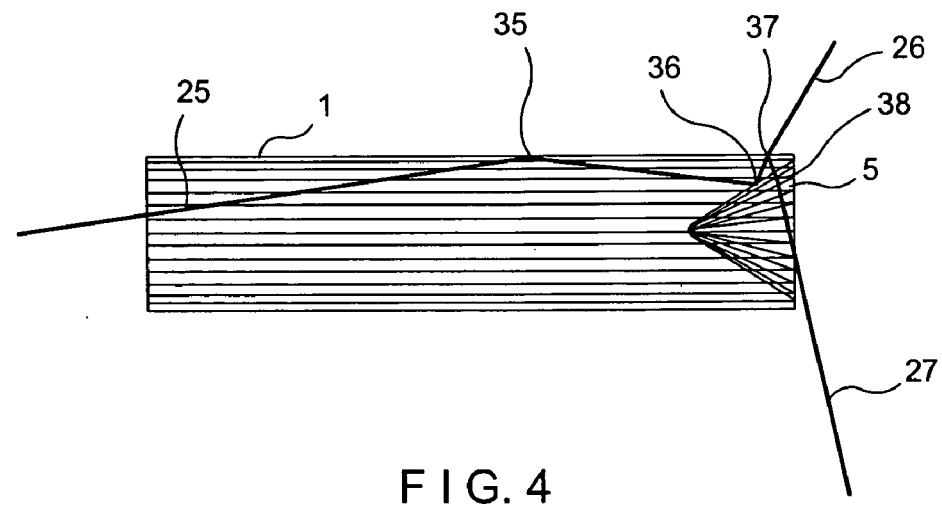
FIG. 4 shows a second example of a light beam traveling through a light pipe having a conical depression dispersion structure according to the present invention.

FIG. 4 shows a second example of a light beam 25 traveling through the light pipe 1 having the dispersion structure 5. In this example the light beam 25 initially enters the light pipe 1 at an angle of 12 degrees from the longitudinal axis running through the apex of the dispersion structure 5. The first contact the light beam 25 has with a material-air boundary is at the side of the light pipe at the point 35. The light beam 25 experiences total internal reflection and then continues to travel through the light pipe until it hits the boundary at point 36 of the dispersion structure 5. Once again, the light beam 25 experiences total internal reflection and travels through the light pipe 1 until it hits the boundary at point 37. In this example, a portion of the light beam 25 is refracted as light beam 26 which continues to travel through the air. Another portion of light beam 25 is reflected as light beam 27 which hits the boundary at point 38 and is refracted into the air as illustrated in FIG. 4.

Figure 5:
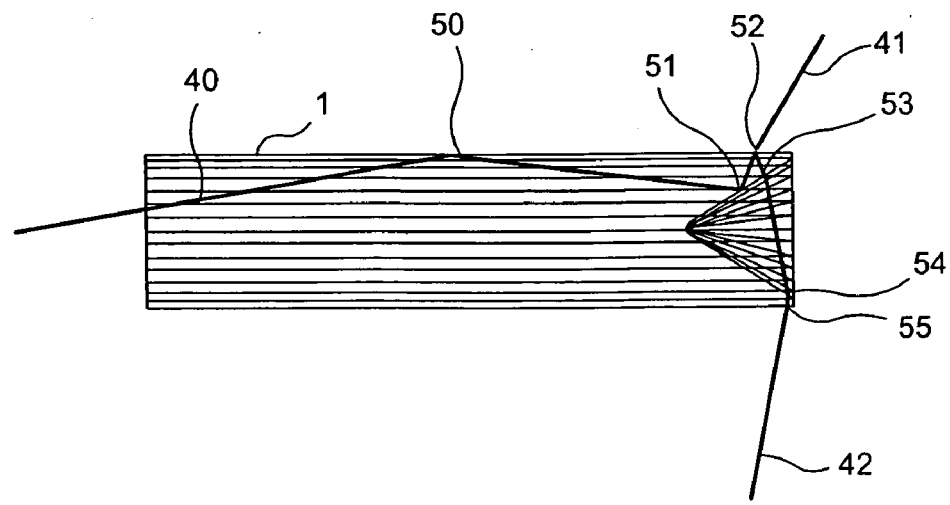
FIG. 5 shows a third example of a light beam traveling through a light pipe having a conical depression dispersion structure according to the present invention.

FIG. 5 shows a third example of a light beam 40 traveling through the light pipe 1 having the dispersion structure 5. In this example the light beam 40 initially enters the light pipe 1 at an angle of 13 degrees from the longitudinal axis running through the apex of the dispersion structure 5. The first contact the light beam 40 has with a material-air boundary is at the side of the light pipe at the point 50. The light beam 40 experiences total internal reflection and then continues to travel through the light pipe until it hits the boundary at point 51 of the dispersion structure 5. Once again, the light beam 40 experiences total internal reflection and travels through the light pipe 1 until it hits the boundary at point 52. In this example, a portion of the light beam 40 is refracted as light beam 41 which continues to travel through the air. Another portion of light beam 40 is reflected as light beam 42 which hits the boundary at point 53 and is refracted into the air formed by the conical depression of the dispersion structure 5. However, the light beam 42 encounters a boundary at point 54 and is refracted back into the light pipe 1 until it encounters another boundary at point 55, where the light beam 42 is refracted back out into the air.

FIG. 6 shows a first example of a bundle of light beams 60 traveling through a light pipe 1 having a conical depression dispersion structure 5. The bundle of light beams 60 is produced by a light source (not shown). The spread of the light beams 60 is 8 degrees pointing zero degrees from the longitudinal axis running through the apex of the dispersion structure 5. As shown in FIG. 6, the bundle of light beams 60 strike the material air boundary at the dispersion structure 5 at various angles resulting in a series of reflections and refractions in the manner described above. This series of reflections and refractions results in the initial 8 degree bundle of light beams 60 being dispersed out over a much larger angle.

FIG. 7 shows a second example of a bundle of light beams 70 traveling through a light pipe 1 having a conical depression dispersion structure 5. The bundle of light beams 70 is produced by a light source (not shown). The spread of the light beams 60 is 8 degrees pointing five degrees from the longitudinal axis running through the apex of the dispersion structure 5. The bundle of light beams 70 strike the material air boundary at the dispersion structure 5 at various angles resulting in a series of reflections and refractions to produce the dispersion pattern illustrated by FIG. 7. By offsetting the bundle of light beams 70 from the longitudinal axis, a more specific dispersion pattern can be achieved by the dispersion structure 5.

Those of skill in the art will understand that the light beams and bundles of light beams illustrated in FIGS. 3-7 may be oriented in various manners to produce a series of dispersion patterns that suit the particular application.

Figure 8:
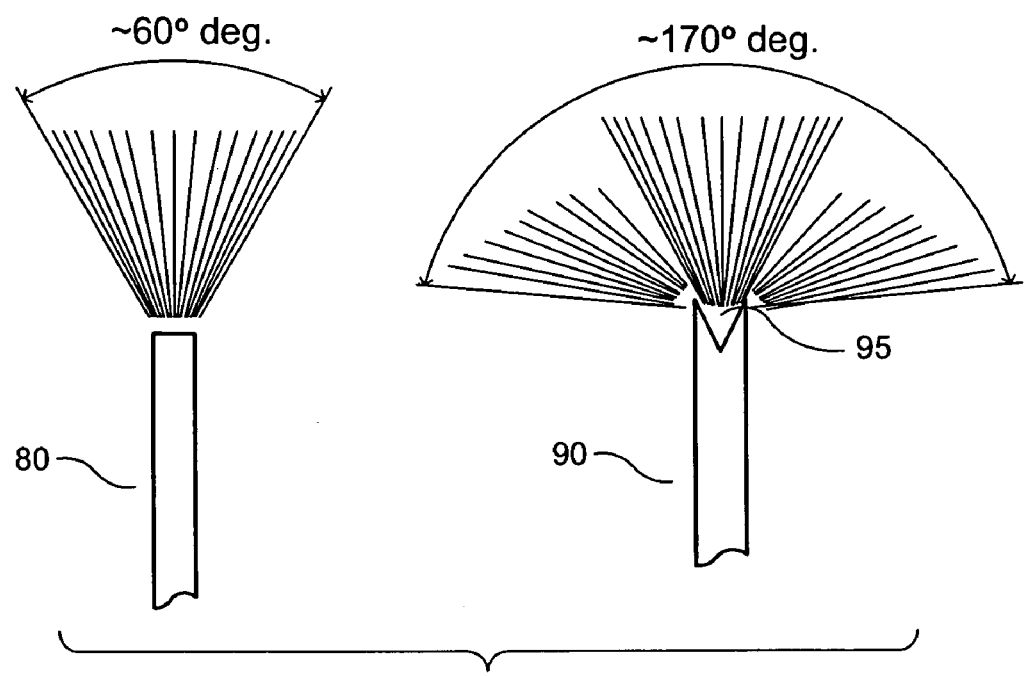
FIG. 8 shows an exemplary comparison of the field of view of a first light pipe without a dispersion structure and a second light pipe having a dispersion structure according to the present invention.

FIG. 8 shows an exemplary comparison of the field of view of a first light pipe 80 without dispersion structures and a second light pipe 90 having a dispersion structure 95. As shown in FIG. 8, the light dispersion from the light pipe 80 without a dispersion structure is along a very narrow field of view of approximately 60°. As described above, in a light pipe, the light travels based on the principal of total internal reflection and generally reflects through the light pipe at various angles. Thus, when the actual light reaches the light-emitting surface of the light pipe 80, it leaves the light-emitting surface at various angles resulting in the approximately 60° field of view shown.

In contrast, the light pipe 90 having the dispersion structure 95 has light dispersion over a wide field of view of approximately 170°. As described above, the light traveling through the light pipe 90 reflects in the same way. However, when the light reaches the dispersion structure 95, the light undergoes a series of refractions and reflections to disperse the light over a larger viewing field. Those of skill in the art will understand that the approximately 170° viewing field is based on the particular dispersion structure 95 modeled in FIG. 8 and that it may be possible to have other dispersion structures which extend the viewing field up to a full 180°.

It should be noted that the above described examples showed a single light pipe having a single dispersion structure. In other embodiments, the light pipe may be a bundle of light pipes having numerous individual channels with each channel carrying light from an individual light source or a common light source. Thus, the accumulation of the wide viewing angles of each of the individual light pipes creates a large viewing angle for the application.

In another exemplary embodiment, it may be possible to include multiple conical shaped depression dispersion structures at the light-emitting end of a light pipe or a series of light pipes. These multiple dispersion structures may be laid out in a variety of patterns on the light-emitting end of the light pipe. It is also possible to polish or texture the light-emitting surface of the dispersion structure to obtain different optical characteristics for the dispersion structure.

Figure 9:
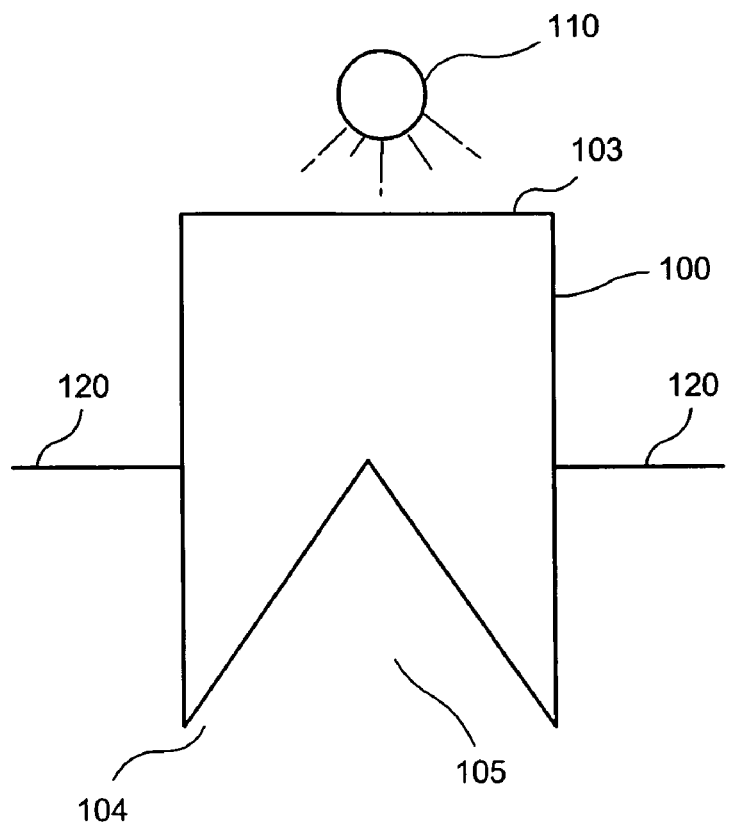
FIG. 9 shows an exemplary implementation of a light pipe having a dispersion structure according to the present invention.

FIG. 9 shows an exemplary implementation of a light pipe 100 having a dispersion structure 105. In this example, the light pipe 100 is moving light from the light source 110 to a location remote from the light source 110. For example, the light source 110 may be located on a piece of equipment which is mounted within a ceiling of a room, but an individual or a device in the room may desire to view or use the light from the light source 110. In such a case, the light pipe 100 may be mounted such that the light receiving end 103 is mounted near the light source 110. Those of skill in the art will understand that in some cases the light pipe 100 and the light source 110 may have housings, couplings or similar devices to allow for a mechanical coupling of the light pipe 100 and the light source 110.

The light pipe 100 is further mounted to extend through the ceiling 120 of the room such that the light-emitting end 104 of the light pipe 100 is in the room. Thus, the light is transmitted from the light source 110 through the light pipe 100 and emitted from the light-emitting surface of the dispersion structure 105 so that the individual or device in the room can view or use the light. As described above, the exemplary embodiment of the light pipe 100 with the dispersion structure 105 provides for a much wider field of view than a standard light pipe without sacrificing the intensity of the light. As illustrated in some of the examples described above, the dispersion pattern resulting from the dispersion structure 105 may cause some of the light beams to exit through the side of the light pipe 100. Thus, the light pipe 100 is placed to extend below the line of the ceiling 120 in order to take full advantage of the improved dispersion pattern provided by the dispersion structure 105.

In addition, because the exemplary dispersion structure 105 is a depression in the end of the light pipe, i.e., the dispersion structure and corresponding light-emitting surface are below flush of the end of the light pipe, the design is resistant to contact damage or wear due to rough handling or other mechanical factors which may cause damage to the light pipe.

Furthermore, in each of the above described examples, the light pipes are shown as straight. However, a great advantage of modern light pipes is that they are flexible and can be bent in various directions to complete a run of light pipe. Thus, it is possible to move light from a first location to a second location even though there are no direct line of sights between the locations. The exemplary embodiment of the present invention allows for a more efficient movement of this light and a wider field of view without sacrificing the end intensity of the light.

It will be apparent to those skilled in the art that various modifications and variations can be made in the dispersion structure and the methodology of the present invention, without departing from the spirit or scope of the invention. Thus, it is intended that the present invention cover the modifications and variations of this invention provided they come within the scope of the appended claims and their equivalents.

What is claimed is:

1. A light pipe, comprising:
   a first end receiving light beams from a light source;
   a light pipe body through which the light beams travel; and
   a second end including a dispersion structure with a light emitting surface, the dispersion structure being a substantially conical shaped depression in the second end, wherein a longitudinal axis of the dispersion structure is not parallel to a longitudinal axis of the light pipe.

2. The light pipe according to claim 1, wherein the conical shaped depression has a cone angle of between 70 degrees and 80 degrees.

3. The light pipe according to claim 1, wherein the light pipe is comprised of one of glass or plastic.

4. The light pipe according to claim 1, wherein the light pipe has a first index of refraction which is higher than a second index of refraction of a medium into which the light beams are emitted.

5. The light pipe according to claim 4, wherein the medium is air.

6. The light pipe according to claim 1, wherein one of the light beams arrives at the light emitting surface and is one of the beams emitted without refraction, emitted with refraction and substantially internally reflected.

7. The light pipe according to claim 1, wherein the dispersion structure includes a plurality of similarly shaped dispersion structures.

8. The light pipe according to claim 1, wherein the light emitting surface of the dispersion structure is one of polished and textured.

9. The light pipe according to claim 1, wherein the light beams are emitted in a pre-determined direction that is substantially along the longitudinal axis of the dispersion structure.

10. A method for dispersing light beams over a range of angles, comprising the steps of:
    receiving light beams into a body of a light pipe;
    transmitting the light beams through the body of the light pipe to a dispersion structure of the light pipe, the dispersion structure being a substantially conical shaped depression in a light emitting end of the light pipe, wherein a longitudinal axis of the dispersion structure is not parallel to a longitudinal axis of the light pipe; and
    emitting a first portion of the light beams from the dispersion structure, wherein the first portion of light beams are emitted upon first contact with an emission surface of the dispersion structure, the first portion of light beams being refracted when emitted.

11. The method according to claim 10, further comprising the step of:
    emitting a second portion of the light beams from the dispersion structure, wherein the second portion of light beams are internally reflected upon first contact with the emission surface and emitted upon subsequent contact with the emission surface.

12. The method according to claim 10, further comprising the step of:
    generating the light beams.

13. The method according to claim 10, wherein the light pipe has a first index of refraction which is greater than a second index of refraction of a medium into which the light beams are emitted.

14. A system, comprising:
    a light source producing light beams; and
    a light pipe including a dispersion structure with a light emitting surface, the dispersion structure being a substantially conical shaped depression in the second end, wherein a longitudinal axis of the dispersion structure is not parallel to a longitudinal axis of the light pipe.

15. The system according to claim 14, wherein the light pipe further includes a light receiving end to receive the light beams from the light source.

* * * * *